United States Patent
Lee

(10) Patent No.: US 9,866,314 B2
(45) Date of Patent: Jan. 9, 2018

(54) PROTECTION SWITCHING METHOD AND APPARATUS FOR MINIMIZING DATA LOSS IN OPTICAL TRANSPORT NETWORK SYSTEM

(71) Applicant: ELECTRONICS AND TELECOMMUNICATIONS RESEARCH INSTITUTE, Daejeon (KR)

(72) Inventor: Seung Woo Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/131,424

(22) Filed: Apr. 18, 2016

(65) Prior Publication Data

US 2016/0315696 A1    Oct. 27, 2016

(30) Foreign Application Priority Data

Apr. 23, 2015 (KR) ........................ 10-2015-0057255

(51) Int. Cl.

| H04B 10/00 | (2013.01) |
|---|---|
| H04B 10/032 | (2013.01) |
| H04Q 11/00 | (2006.01) |
| H04L 7/00 | (2006.01) |

(52) U.S. Cl.
CPC ......... *H04B 10/032* (2013.01); *H04L 7/0075* (2013.01); *H04Q 11/0005* (2013.01); *H04Q 2011/0043* (2013.01)

(58) Field of Classification Search
CPC ............ H04B 10/032; H04Q 11/0005; H04Q 2011/0043; H04L 7/0075
See application file for complete search history.

(56) References Cited

U.S. PATENT DOCUMENTS

| 5,280,376 | A | * | 1/1994 | Takahashi | ............ | H04B 10/032 |
|---|---|---|---|---|---|---|
| | | | | | | 356/73.1 |
| 5,471,332 | A | * | 11/1995 | Shiragaki | .................. | H04L 1/22 |
| | | | | | | 398/45 |
| 8,437,280 | B2 | * | 5/2013 | Grover | .................. | H04L 41/024 |
| | | | | | | 370/255 |
| 9,100,247 | B2 | * | 8/2015 | Grover | .................. | H04L 41/024 |
| 2004/0208527 | A1 | * | 10/2004 | Mantin | ................ | H04B 10/032 |
| | | | | | | 398/33 |
| 2005/0213972 | A1 | * | 9/2005 | Aoki | .................... | H04B 10/032 |
| | | | | | | 398/49 |
| 2008/0232274 | A1 | * | 9/2008 | Grover | .................. | H04L 41/024 |
| | | | | | | 370/255 |

(Continued)

FOREIGN PATENT DOCUMENTS

KR          20140118600 A      10/2014

*Primary Examiner* — Danny Leung
(74) *Attorney, Agent, or Firm* — Ladas & Parry LLP

(57) ABSTRACT

Provided is a linear automatic protection switching (APS) apparatus and method that minimizes a data loss in an optical transport network (OTN) system, the apparatus and method that may maintain time synchronization by transmitting/receiving time synchronization signals between APS apparatuses of a working path and a redundant path, and transmitting/receiving time synchronization signals between local and remote APS apparatuses.

19 Claims, 11 Drawing Sheets

(56) References Cited

U.S. PATENT DOCUMENTS

| | | | | |
|---|---|---|---|---|
| 2009/0100193 | A1* | 4/2009 | Natarajhan | G06F 15/173 709/239 |
| 2010/0142942 | A1* | 6/2010 | Rhee | H04Q 11/0005 398/25 |
| 2010/0238936 | A1* | 9/2010 | Matsui | H04L 49/1523 370/394 |
| 2013/0084063 | A1* | 4/2013 | Hu | H04L 49/10 398/2 |
| 2013/0170837 | A1* | 7/2013 | Kim | H04J 14/08 398/89 |
| 2013/0243417 | A1* | 9/2013 | Youn | H04B 10/032 398/5 |
| 2013/0326073 | A1* | 12/2013 | Grover | H04L 41/024 709/227 |
| 2014/0064064 | A1* | 3/2014 | Kim | H04L 45/28 370/225 |
| 2014/0363152 | A1* | 12/2014 | Hironaka | H04Q 11/0005 398/5 |
| 2016/0020850 | A1* | 1/2016 | Youn | H04B 10/032 398/5 |
| 2016/0149752 | A1* | 5/2016 | Belanger | H04L 41/0659 370/216 |
| 2016/0156410 | A1* | 6/2016 | Guo | H04Q 11/0066 398/2 |
| 2016/0164760 | A1* | 6/2016 | Wakabayashi | H04L 43/0864 370/252 |
| 2016/0308604 | A1* | 10/2016 | Fujii | H04B 10/038 |
| 2016/0315696 | A1* | 10/2016 | Lee | H04B 10/032 |
| 2017/0033563 | A1* | 2/2017 | Lee | H04J 3/0661 |

* cited by examiner

FIG. 5

| 1 | | | | | | | | 2 | | | | | | | | 3 | | | | | | | | 4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| Request/ state information | | | | Protection type | | | | Request signal information | | | | | | | | Bridge signal information | | | | | | | | Reserved | | | | | | | |
| | | | | A | B | D | R | | | | | | | | | | | | | | | | | | | | | | | | |

FIG. 6

| Row # | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | | | | Frame alignment overhead | | | | | | OPUk overhead | | | | | | |
| 2 | RES (Time information) | | | TCM ACT | | TCM6 | | | TCM5 | | | TCM4 | | FTFL | | |
| 3 | TCM3 | | | TCM2 | | | | TCM1 | | | PM | | | EXP | | |
| 4 | GCC1 | | GCC2 | | | APS/PCC | | | | RES(Time information) | | | | | | |

PROTECTION SWITCHING METHOD AND APPARATUS FOR MINIMIZING DATA LOSS IN OPTICAL TRANSPORT NETWORK SYSTEM

CROSS-REFERENCE TO RELATED APPLICATION

This application claims the priority benefit of Korean Patent Application No. 10-2015-0057255, filed on Apr. 23, 2015, in the Korean Intellectual Property Office, the disclosure of which is incorporated herein by reference.

BACKGROUND

1. Field of the Invention

Embodiments relate to a linear protection switching method in an optical transport network (OTN) system, and more particularly to, a linear protection switching method and apparatus for minimizing a data loss occurring when switching times for performing protection switching in an OTN system are different.

2. Description of the Related Art

An optical transport network (OTN) system may transport, multiplex, route, and monitor signals of a client layer in an optical domain. The OTN system may encapsulate the signals of the client layer and transmit the encapsulated signals to a layer including an optical channel transport unit (OTU), an optical channel data unit (ODUk), and an optical channel payload unit (OPUk) over an OTN. Here, k may be a value varying depending on a bit rate, for example, k=1, 2, or 3. A frame format of the OTN is defined in ITU-T Recommendation G.709, and includes an OTUk, an ODUk, an OPUk overhead, an OPUk payload area, and a forward effort correction (FEC) area.

An automatic protection switching (APS) protocol defined in ITU-T Recommendation G.873.1 may be used to perform linear protection switching in the OTN system. This Recommendation defines various linear protection switching methods in an OTN system at a level of ODUk. Further, the Recommendation describes purposes and applications of the switching methods.

SUMMARY

An aspect provides technology that may perform protection switching at the same time by transmitting/receiving a time synchronization signal and a switching over time between a transmission medium present on a local working path and a transmission medium present on a local redundant path.

Another aspect also provides technology that may perform protection switching at the same time by transmitting/receiving a time synchronization signal and a switching over time between a transmission medium present on a local redundant path and a transmission medium present on a remote redundant path.

Still another aspect also provides a method of transmitting information to be used for time synchronization using an automatic protection switching (APS) frame.

Yet another aspect also provides technology that may minimize a data loss occurring due to protection switching by opening/closing traffic paths of a transmission medium of a working path and a transmission medium of a redundant path at the same time.

According to an aspect, there is provided a linear APS apparatus in an optical transport network (OTN) system, the apparatus including a receiver configured to receive signal defect information of a first transmission medium belonging to a redundant path and a second transmission medium belonging to a working path, and command information of an operator, a controller configured to generate a switching command to change traffic paths of the first transmission medium and the second transmission medium and switching information corresponding to the switching command based on the signal defect information and the command information, and determine a switching over time to execute the switching command, and a transmitter configured to transmit the switching command and the switching over time.

The transmitter may be configured to transmit the switching information and the switching over time to an OTN framer of the first transmission medium, and the OTN framer of the first transmission medium may be configured to open/close the traffic path of the first transmission medium at the switching over time.

The switching command may be determined based on a priority of the signal defect information and a priority of the command information.

The switching command may be generated by an APS protocol.

The transmitter may be configured to transmit the switching command, the switching information corresponding to the switching command, and the switching over time to the second transmission medium.

The switching over time may be recorded in a reserved area of an APS frame and the APS frame may be transmitted.

The transmitter may be configured to transmit a first time synchronization signal of the first transmission medium to the second transmission medium, the receiver may be configured to receive a second time synchronization signal of the second transmission medium, and the controller may be configured to perform time synchronization between the first transmission medium and the second transmission medium based on the first time synchronization signal and the second time synchronization signal.

The controller may be configured to compute a time offset To and a delay time Td based on a time $T_1$ at which the second time synchronization signal departs from the second transmission medium, a time $T_2$ at which the second time synchronization signal arrives at the first transmission medium, a time $T_3$ at which the first time synchronization signal departs from the first transmission medium, and a time $T_4$ at which the first time synchronization signal arrives at the second transmission medium, and perform the time synchronization by adding the computed time offset To and the computed delay time Td to time information of the first transmission medium, wherein the time offset To and the delay time Td may be computed using equations $To=0.5*\{(T_2-T_1)+(T_3-T_4)\}$ and $Td=0.5*\{(T_4-T_1)-(T_3-T_2)\}$, respectively.

The first time synchronization signal, the second time synchronization signal, the time $T_1$, the time $T_2$, the time $T_3$, and the time $T_4$ may be recorded in a reserved area of an APS frame and the APS frame may be transmitted/received.

The controller may be configured to generate an APS frame including the switching command and the switching information by executing an APS protocol, and the APS frame and the switching over time may be transmitted to a third transmission medium belonging to the redundant path.

The transmitter may be configured to transmit the APS frame to an OTN framer of the first transmission medium, and the OTN framer of the first transmission medium may be configured to record the APS frame in an overhead of an optical data unit (ODU) frame and transmit the ODU frame to the third transmission medium.

The switching over time may be recorded in a reserved area of the APS frame or in a reserved area of the overhead of the ODU frame.

The transmitter may be configured to transmit the first time synchronization signal of the first transmission medium to the third transmission medium, the receiver may be configured to receive a third time synchronization signal of the third transmission medium, the controller may be configured to perform time synchronization between the first transmission medium and the third transmission medium based on departure and arrival times of the first time synchronization and departure and arrival times of the third time synchronization signal, and the first time synchronization signal, the departure and arrival times of the first time synchronization signal, the third time synchronization signal, and the departure and arrival times of the third time synchronization signal may be recorded in a reserved area of the APS frame or in a reserved area of an overhead of an ODU frame and the APS frame or the ODU frame may be transmitted/received.

An APS apparatus of the third transmission medium may be configured to receive the APS frame and the switching over time, and generate a second switching command to change traffic paths of the third transmission medium and a fourth transmission medium and second switching information corresponding to the second switching command based on the APS frame, the fourth transmission medium belonging to the working path, open/close the traffic path of the third transmission medium by transmitting the second switching information and the switching over time to an OTN framer of the third transmission medium, and transmit the second switching command, the second switching information, and the switching over time to the fourth transmission medium.

The third transmission medium may be configured to transmit/receive a time synchronization signal to/from the fourth transmission medium, and perform time synchronization between the third transmission medium and the fourth transmission medium, and the time synchronization signal may be recorded in a reserved area of an APS frame and the APS frame may be transmitted/received.

According to another aspect, there is also provided a linear APS apparatus in an OTN system, the apparatus including a receiver configured to receive, from a first transmission medium belonging to a redundant path, a switching command to change traffic paths of the first transmission medium and a second transmission medium belonging to a working path, switching information corresponding to the switching command, and a switching over time to execute the switching command, a controller configured to execute the switching command at the switching over time, and a transmitter configured to transmit signal defect information of the second transmission medium to the first transmission medium.

The transmitter may be configured to transmit the switching information and the switching over time to an OTN framer of the second transmission medium, record a second time synchronization signal of the second transmission medium in a reserved area of an APS frame, and transmit the APS frame to the first transmission medium, the receiver may be configured to receive a first time synchronization signal of the first transmission medium, the controller may be configured to perform time synchronization between the first transmission medium and the second transmission medium based on the first time synchronization signal and the second time synchronization signal, and the OTN framer of the second transmission medium may be configured to open/close the traffic path of the second transmission medium at the switching over time.

The transmitter may be configured to transmit the second time synchronization signal of the second transmission medium to the first transmission medium, the receiver may be configured to receive the first time synchronization signal of the first transmission medium, and the controller may be configured to perform time synchronization between the first transmission medium and the second transmission medium based on the first time synchronization signal and the second time synchronization signal.

According to still another aspect, there is also provided a linear APS method including performing time synchronization between a first transmission medium belonging to a redundant path and a second transmission medium belonging to a working path based on a time synchronization signal of the first transmission medium and a time synchronization signal of the second transmission medium, performing time synchronization between the first transmission medium and a third transmission medium belonging to the redundant path by transmitting the time synchronization signal of the first transmission medium to the third transmission medium, performing time synchronization between the third transmission medium and a fourth transmission medium belonging to the working path based on a time synchronization signal of the third transmission medium and a time synchronization signal of the fourth transmission medium, generating a first switching command to change traffic paths of the first transmission medium and the second transmission medium and a switching over time to execute the first switching command based on signal defect information of the first transmission medium and the second transmission medium and command information of an operator, generating an APS frame including the first switching command and the switching over time by executing an APS protocol, generating a second switching command to change traffic paths of the third transmission medium and the fourth transmission medium based on the APS frame, opening/closing the traffic paths of the first transmission medium and the second transmission medium at the switching over time based on the first switching command, and opening/closing the traffic paths of the third transmission medium and the fourth transmission medium at the switching over time based on the second switching command.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 5 is a diagram illustrating an APS frame according to an embodiment;

FIG. 6 is a diagram illustrating an overhead of an optical data unit (ODU) frame according to an embodiment;

DETAILED DESCRIPTION

Figure 1:
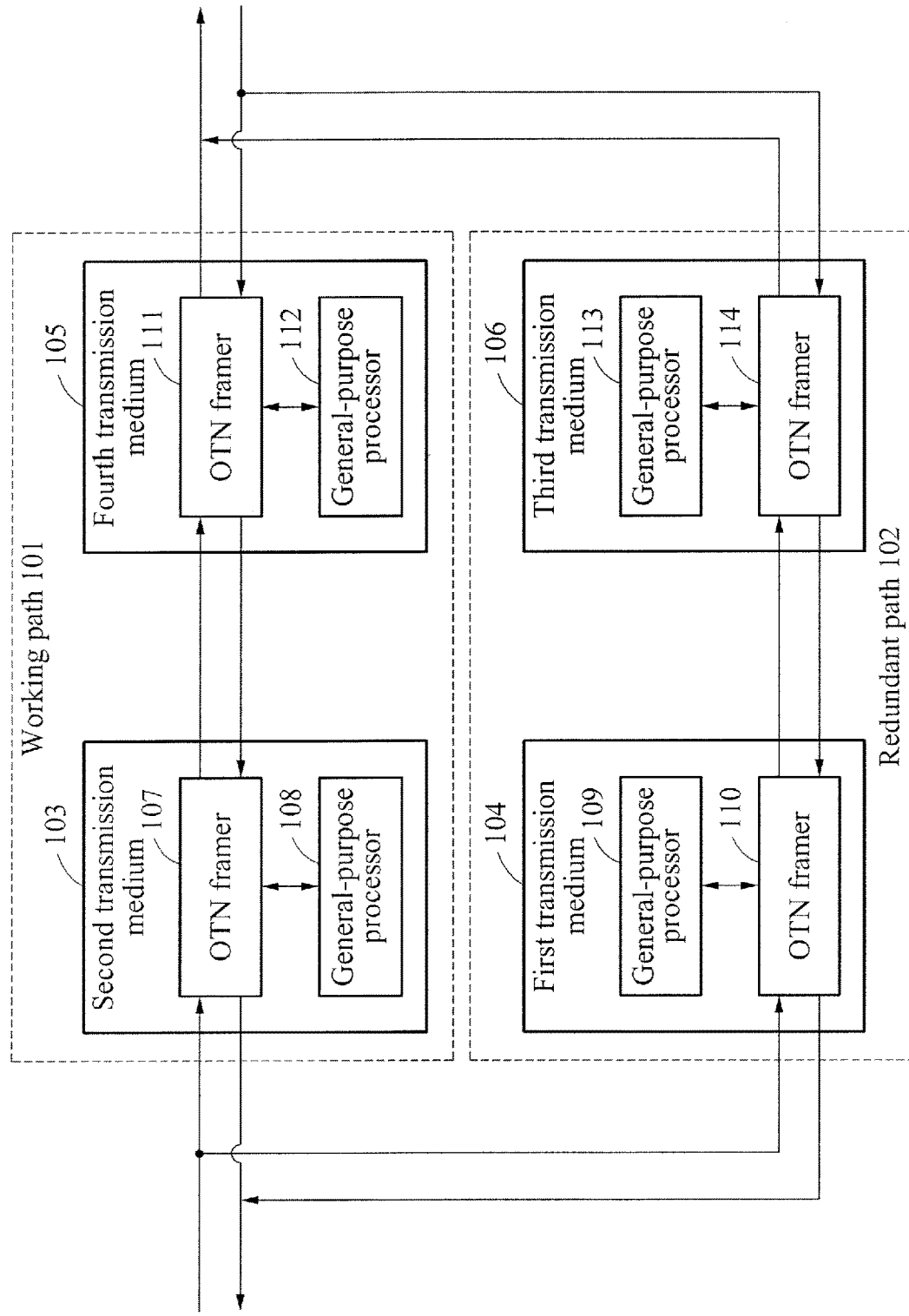
FIG. 1 is a diagram illustrating a configuration of performing automatic protection switching (APS) in an optical transport network (OTN) system.

Various alterations and modifications may be made to the embodiments. Here, the embodiments are not construed as limited to the disclosure and should be understood to include all changes, equivalents, and replacements within the idea and the technical scope of the disclosure.

The terminology used herein is for the purpose of describing particular embodiments only and is not to be limiting of the embodiments. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like constituent elements and a repeated description related thereto will be omitted. When it is determined detailed description related to a related known function or configuration they may make the purpose of the embodiments unnecessarily ambiguous in describing the embodiments, the detailed description will be omitted here.

FIG. 1 is a diagram illustrating a configuration of performing automatic protection switching (APS) in an optical transport network (OTN) system.

Referring to FIG. 1, two transmission media 103 and 105 belonging to a working path 101 and two transmission media 104 and 106 belonging to a redundant path 102 are illustrated. Each transmission medium corresponds to a line card of the OTN system. The four transmission media 103, 104, 105, and 106 may include OTN framers 107, 110, 111, and 114, and general-purpose processors 108, 109, 112, and 113, respectively. The general-purpose processors 108, 109, 112, and 113 may be central processing units (CPUs) which receive signal defect information from the respective OTN framers 107, 110, 111, and 114 and perform functions for protection switching.

Protection switching in the OTN system may be performed through communications among an upper main processor, host processors, for example, the general-purpose processors 108, 109, 112, and 113, and the OTN framers 107, 110, 111, and 114 mounted in the line cards of the OTN system. The host processors, the general-purpose processors, or the CPUs 108, 109, 112, and 113 may use an APS frame, an operations, administration, and maintenance (OAM) frame, and the like and perform protection switching with respect to a transmission path by operating and processing an APS protocol which is a linear protection switching protocol. To perform protection switching, information related to an error occurring on the transmission path may be recognized by the OTN framer 110, and transmitted to the host processor 109 mounted in a line card. The host processor 109 may perform software-based protection switching by operating an APS protocol for protection switching and performing a switching function.

Protection switching by a forced switching command or a manual switching command may be performed through communications between the OTN framer 110 and the host processor 109 receiving a command of the main processor. The host processor 109 receiving the command from the main processor may perform forced or manual switching with respect to the transmission path by processing an APS message frame corresponding to a linear protection switching protocol of the OTN system. When an operator issues the forced or manual switching command to the main processor, the host processor 109 mounted in the line card may receive information related to the forced or manual switching command, and perform software-based protection switching by operating an APS protocol for the forced or manual switching. By the APS protocol, the OTN framers 107 and 111 of the working path 101 and the OTN framers 110 and 114 of the redundant path 102 may transmit or may not transmit data by opening/closing switches in the respective OTN framers 107, 110, 111, and 114 based on a situation of the command. The host processors 108, 109, 112, and 113 of the working path 101 and the redundant path 102 may determine switching commands or states by executing the APS protocol, and open/close traffic paths by turning ON or OFF the switches in the OTN framers 107, 110, 111, and 114 based on the determined commands or states.

The OTN framers 107, 110, 111, and 114 mounted in the respective transmission media 103, 104, 105, and 106 may open/close the traffic paths based on commands to perform switching. In this example, a portion of flowing data may be lost due to different switching times at the OTN framers 107, 110, 111, and 114 of the working path 101 and the redundant path 102. Switching times may not match between the first transmission medium 104 and the second transmission medium 103 corresponding to local line cards. The first transmission medium 104 may transmit an APS frame to the third transmission medium 106 corresponding to a remote line card, and the third transmission medium 106 may execute an APS protocol using the received APS frame. Thus, a time at which the switching command is transmitted differs from a time at which the switching command is determined, and the switching times do not match. In a case in which switching times are different in protection switching in an OTN system, a loss of data traffic may occur.

Figure 2:
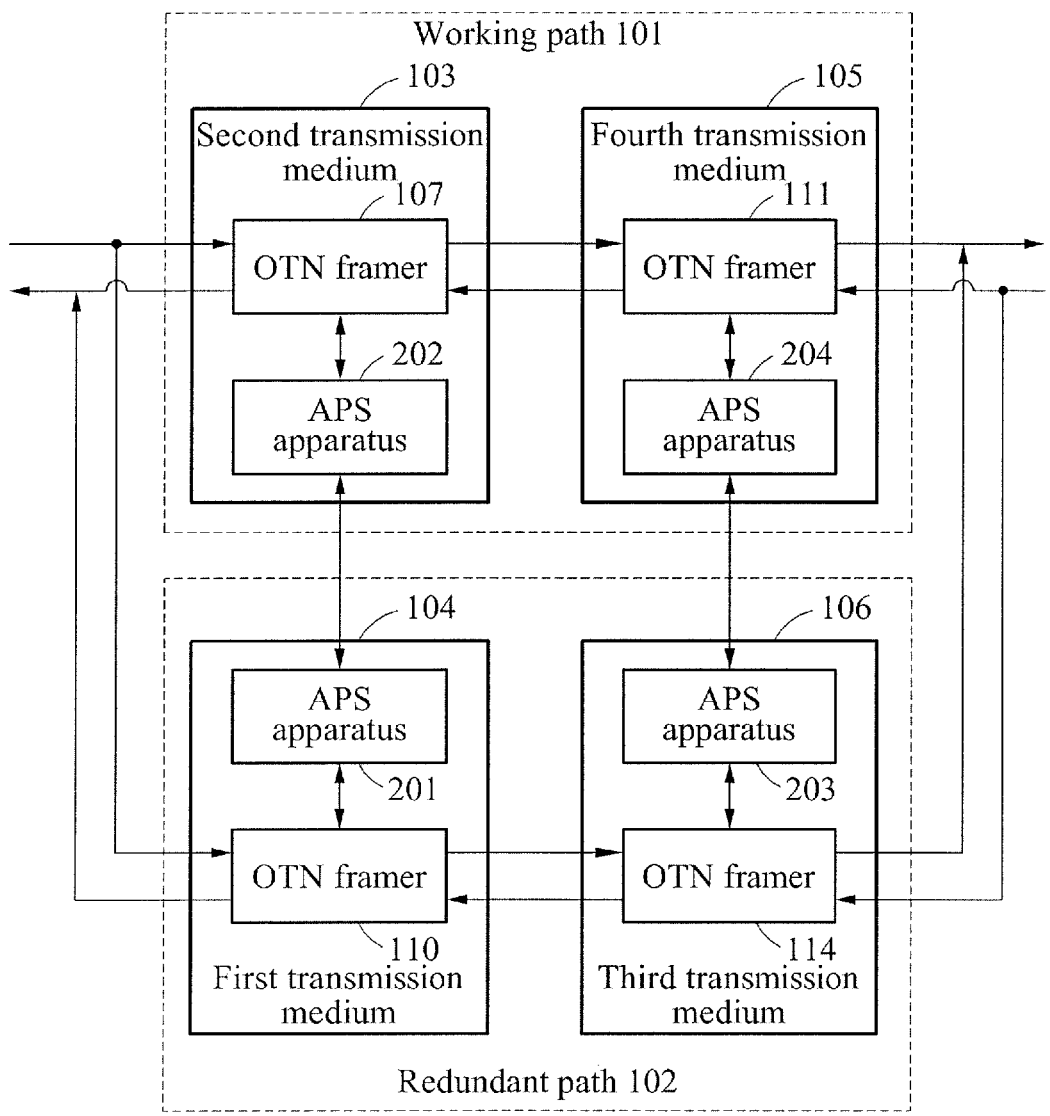
FIG. 2 is a diagram illustrating a configuration of performing APS through time synchronization according to an embodiment.

FIG. 2 is a diagram illustrating a configuration of performing APS through time synchronization according to an embodiment.

Referring to FIG. 2, a first transmission medium 104 and a second transmission medium 103 correspond to local line cards in an OTN system. When signal failure occurs at a receiving port of an OTN framer 107 of the second transmission medium 103 belonging to a working path 101, the OTN framer 107 may transmit signal defect information to an APS apparatus 202 of the second transmission medium 103. The APS apparatus 202 may transmit the signal defect information of the second transmission medium 103 to an APS apparatus 201 of the first transmission medium 104 belonging to a redundant path 102. The APS apparatus 201 of the first transmission medium 104 may receive the signal defect information of the second transmission medium 103, and receive signal defect information of the first transmission medium 104 from an OTN framer 110 of the first transmission medium 104.

Command information of an operator may be input through a main processor, and the APS apparatus 201 of the first transmission medium 104 may receive the command information of the operator through the main processor. The command information of the operator may include one of a forced switching command, an automatic switching command, and a manual switching command.

The APS apparatus 201 may determine a priority of the signal defect information based on the signal defect information of the second transmission medium 103 belonging to the working path 101 and the signal defect information of the first transmission medium 104 belonging to the redundant path 102. The APS apparatus 201 may determine a priority of the command information based on the command information of the operator received from the main processor. The APS apparatus 201 may generate a switching command to change traffic paths of the second transmission medium 103 and the first transmission medium 104 based on the signal defect information of the second transmission medium 103 and the first transmission medium 104 and the command information. The switching command may be determined based on the priority of the signal defect information of the second transmission medium 103 and the first transmission medium 104 and the priority of the command information. The APS apparatus 201 may execute an APS protocol of ITU-T Recommendation G.873.1. The APS apparatus 201 may execute the APS protocol based on the signal defect information of the first transmission medium 104 and the second transmission medium 103 and the command information of the operator, thereby generating the switching command. Further, the APS apparatus 201 may generate switching information for the OTN framers 107 and 110 to execute the switching command.

The APS apparatus 201 may determine a switching over time corresponding to a time at which the generated switching command is to be executed. The first transmission medium 104 and the second transmission medium 103 may perform protection switching at the switching over time determined by the APS apparatus 201 of the first transmission medium 104. The OTN framers 110 and 107 of the first transmission medium 104 and the second transmission medium 103 may perform switching to open/close the traffic paths at the determined switching over time.

The first transmission medium 104 corresponding to a local line card belonging to the redundant path 102 and the second transmission medium 103 corresponding to a local line card belonging to the working path 101 may transmit/receive time synchronization signals to/from each other. The APS apparatus 201 may transmit a time synchronization signal of the first transmission medium 104 to the APS apparatus 202. The APS apparatus 202 may transmit a time synchronization signal of the second transmission medium 103 to the APS apparatus 201. The APS apparatus 201 may perform time synchronization between the second transmission medium 103 and the first transmission medium 104 based on the time synchronization signal of the first transmission medium 104 and the time synchronization signal, of the second transmission medium 103, received from the APS apparatus 202. The APS apparatuses 201 and 202 may periodically transmit/receive time synchronization signals to/from each other and perform time synchronization.

The APS apparatus 201 may perform protection switching based on the generated switching command, the switching information, and the switching over time. The APS apparatus 201 may transmit the switching information and the switching over time to the OTN framer 110 of the first transmission medium 104. The OTN framer 110 may turn ON or OFF a switch on the traffic path based on the switching information at the received switching over time.

The APS apparatus 201 of the first transmission medium 104 may transmit the switching command, the switching information, and the switching over time to the APS apparatus 202 of the second transmission medium 103. The APS apparatus 202 may perform protection switching based on the received switching command, the switching information, and the switching over time. The APS apparatus 202 may transmit the switching information corresponding to the switching command and the switching over time to the OTN framer 107. The OTN framer 107 may turn ON or OFF a switch on the traffic path based on the switching information at the received switching over time. The OTN framers 110 and 107 of the first transmission medium 104 and the second transmission medium 103 may switch the traffic paths at the same switching over time based on the switching command generated by the APS apparatus 201. The APS apparatuses 201 and 202 of the first transmission medium 104 and the second transmission medium 103 may transmit/receive time synchronization signals to/from each other and perform time synchronization. The first transmission medium 104 and the second transmission medium 103 may open/close the traffic paths at the same time in a state in which the time synchronization is performed. Thus, a data loss resulting from different switching times of the OTN framers 107 and 110 may be minimized.

Based on a switching state and command information with a high priority determined by the APS apparatus 201 through execution of the APS protocol, the APS apparatus 201 may transmit the switching information and the switching over time for switching to the OTN framer 110. The OTN framer 110 may turn ON or OFF the switch on the traffic path based on the switching information at the received switching over time. The APS apparatus 201 may transmit the switching command, the switching information, and the switching over time to the APS apparatus 202. The APS apparatus 202 may transmit the switching information to be used to execute the received switching command and the switching over time to the OTN framer 107. The OTN framer 107 may turn ON or OFF a switch on the traffic path based on the switching information at the received switching over time. In this example, the OTN framers 110 and 107 of the first transmission medium 104 and the second transmission medium 103 between which time synchronization is performed through periodical transmission/reception of time synchronization signals may open/close the traffic paths at the same switching over time. Thus, a data loss resulting from different switching times of the OTN framers 107 and 110 may be minimized.

The APS apparatus 201 may generate an APS frame including the switching command and the switching information by executing an APS protocol of ITU-T Recommendation G.873.1. The APS apparatus 201 belonging to the local line card may transmit the generated APS frame to a third transmission medium 106. The third transmission medium 106 may correspond to a remote line card belonging to the redundant path 102. The APS apparatus 201 may also transmit the switching over time to execute the switching command to the third transmission medium 106. The APS apparatus 201 may record the switching command generated by executing the APS protocol, the switching information, and the switching over time in the APS frame, and transmit the APS frame to the OTN framer 110. The OTN framer 110 may transmit the APS frame to an OTN framer 114 of the third transmission medium 106.

An APS apparatus 203 may receive the APS frame through the OTN framer 114. The APS apparatus 203 may execute the APS protocol based on the received APS frame, signal defect information of a fourth transmission medium 105, signal defect information of the third transmission medium 106, and the command information of the operator. The APS apparatus 203 may generate a switching command to change traffic paths of the third transmission medium 106 and the fourth transmission medium 105 by executing the APS protocol and switching information corresponding to the switching command. The third transmission medium 106 and the fourth transmission medium 105 may perform protection switching at the switching over time determined by the APS apparatus 201 of the first transmission medium 104. OTN framers 114 and 111 of the third transmission medium 106 and the fourth transmission medium 105 may perform switching to open/close the traffic paths at the determined switching over time.

The first transmission medium 104 corresponding to the local line card belonging to the redundant path 102 and the third transmission medium 106 corresponding to the remote line card belonging to the redundant path 102 may transmit/receive time synchronization signals to/from each other. The APS apparatus 201 of the first transmission medium 104 may record a time synchronization signal of the first transmission medium 104 in the APS frame and transmit the APS frame to the third transmission medium 106. The APS apparatus 203 of the third transmission medium 106 may record a time synchronization signal of the third transmission medium 104 in the APS frame and transmit the APS frame to the first transmission medium 104. The APS apparatuses 201 and 203 of the first transmission medium 104 and the third transmission medium 106 may perform time synchronization between the first transmission medium 104 and the third transmission medium 106 based on the transmitted/received time synchronization signals. The APS apparatuses 201 and 203 may periodically transmit/receive time synchronization signals to/from each other and perform the time synchronization.

The third transmission medium 106 corresponding to the remote line card belonging to the redundant path 102 and the fourth transmission medium 105 corresponding to a remote line card belonging to the working path 101 may transmit/receive time synchronization signals to/from each other. The APS apparatus 203 may transmit the time synchronization signal of the third transmission medium 106 to an APS apparatus 204. The APS apparatus 204 may transmit a time synchronization signal of the fourth transmission medium 105 to the APS apparatus 203. The APS apparatus 203 may perform time synchronization between the third transmission medium 106 and the fourth transmission medium 105 based on the time synchronization signal of the third transmission medium 106 and the time synchronization signal of the fourth transmission medium 105 received from the APS apparatus 204. The APS apparatuses 203 and 204 may periodically transmit/receive time synchronization signals to/from each other and perform the time synchronization.

The APS apparatus 203 of the third transmission medium 106 may perform protection switching based on the switching command generated by the APS protocol, the switching information, and the received switching over time. The APS apparatus 203 may transmit the switching information and the switching over time to the OTN framer 114 of the third transmission medium 106. The OTN framer 114 may turn ON or OFF a switch on the traffic path based on the switching information at the received switching over time.

The APS apparatus 203 of the third transmission medium 106 may transmit, to the APS apparatus 204 of the fourth transmission medium 105, the determined switching command, the switching information, and the received switching over time. The APS apparatus 204 may perform protection switching based on the received switching command, the switching information, and the switching over time. The APS apparatus 204 may transmit the switching information corresponding to the switching command and the switching over time to the OTN framer 111. The OTN framer 111 may turn ON or OFF a switch on the traffic path based on the switching information at the received switching over time.

The OTN framers 107, 110, 111, and 114 of the transmission media 103, 104, 105, and 106 may switch the traffic paths at the same switching over time. The APS apparatuses 201 and 202 of the first transmission medium 104 and the second transmission medium 103 may transmit/receive time synchronization signals to/from each other and perform time synchronization. The APS apparatuses 201 and 203 of the first transmission medium 104 and the third transmission medium 106 may transmit/receive APS frames in which time synchronization signals are recorded to/from each other by executing the APS protocol, and perform time synchronization. The APS apparatuses 203 and 204 of the third transmission medium 106 and the fourth transmission medium 105 may transmit/receive time synchronization signals to/from each other and perform time synchronization. The transmission media 103, 104, 105, and 106 may open/close the traffic paths at the same time in a state in which time synchronization is performed. Thus, a data loss resulting from different switching times of the OTN framers 107, 110, 111, and 114 may be minimized.

Figure 3A:
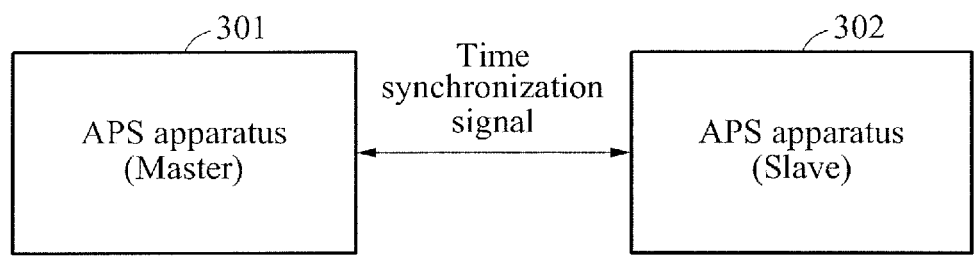
FIGS. 3A and 3B are diagrams illustrating a process of performing time synchronization according to an embodiment.
Figure 3B:
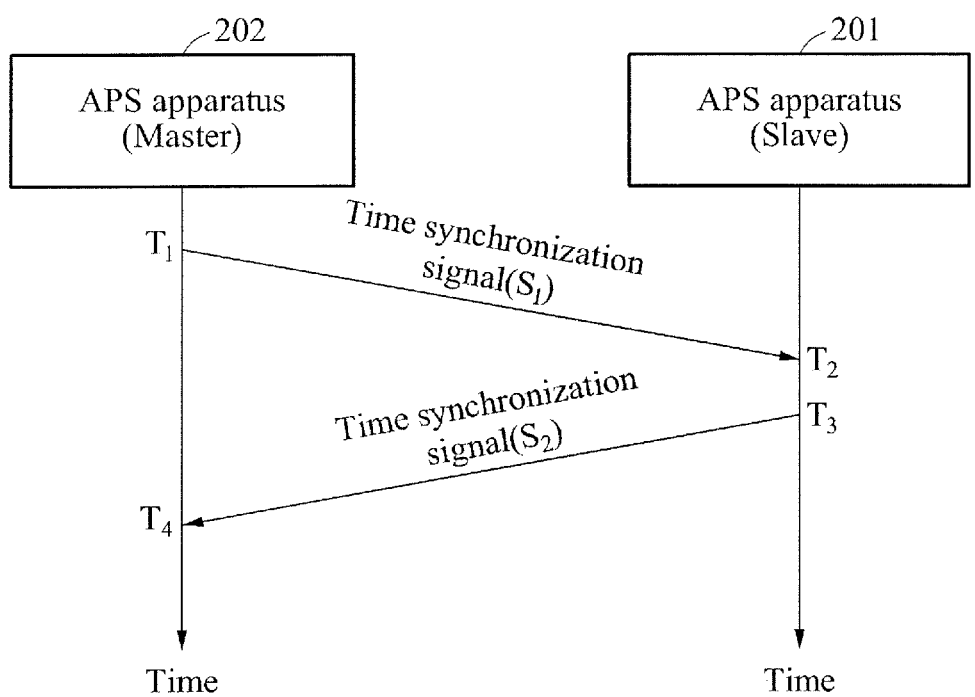

FIGS. 3A and 3B are diagrams illustrating a process of performing time synchronization according to an embodiment.

Referring to FIG. 3A, APS apparatuses 301 and 302 may be set to be a clock master device and a clock slave device to perform time synchronization. The clock master device and the clock slave device may transmit/receive time synchronizations to/from each other. Further, the master device and the slave device may exchange time information related to the time synchronization signals while transmitting/receiving the time synchronization signals. The time information related to the time synchronization signals may be information related to a departure time of a time synchronization signal transmitted from the master device or the slave device and an arrival time of the time synchronization signal received by the master device or the slave device. The departure time and the arrival time of the transmitted/received time synchronization signal may be measured by the master device or the slave device. The times measured by the master device or the slave device may be stored in the corresponding device.

Referring to FIG. 3B, the APS apparatus 202 belonging to the working path 101 of a local line may be set to be a master device, and the APS apparatus 201 belonging to the redundant path 102 of the local line may be set to be a slave device. However, embodiments are not limited to a case in which an APS apparatus belonging to a redundant path is set to be a slave device. A plurality of APS apparatuses for performing time synchronization may be set to be mater devices, slave devices, or a predetermined combination thereof.

A time synchronization signal $S_1$ may be transmitted from the clock master device 202 to the clock slave device 201. A departure time $T_1$ of the time synchronization signal $S_1$ may be measured by the clock master device 202, and transmitted to the clock slave device 201 along with the time synchronization signal $S_1$. The clock slave device 201 may receive the time synchronization signal $S_1$. The clock slave device 201 receiving the time synchronization signal $S_1$ may also receive the departure time $T_1$ of the time synchronization signal $S_1$. The clock slave device 201 may store the received departure time $T_1$ of the time synchronization signal $S_1$. The clock slave device 201 may measure an arrival time $T_2$ of the time synchronization signal $S_1$. The measured arrival time $T_2$ may be stored by the clock slave device 201.

A time synchronization signal $S_2$ may be transmitted from the clock slave device 201 to the clock master device 202. A departure time $T_3$ of the time synchronization signal $S_2$ may be measured by the clock slave device 201. The measured departure time $T_3$ may be stored by the clock slave device 201. The transmitted time synchronization signal $S_2$ may be received by the clock master device 202. The clock master device 202 may measure an arrival time $T_4$ of the time synchronization signal $S_2$. The measured arrival time $T_4$ may be provided to the clock slave device 201, and stored in the clock master device 202. To provide the arrival time $T_4$ to the clock slave device 201, information related to the arrival time $T_4$ may be transmitted from the clock master device 202 to the clock slave device 201. The times $T_1$, $T_2$, $T_3$, and $T_4$ measured by the clock master device 202 and the clock slave device 201 may be stored in the clock slave device 201. The clock slave device 201 may perform time synchronization with the clock master device 202 based on the times $T_1$, $T_3$, and $T_4$. The clock slave device 201 may compute a time offset To and a delay time Td based on the times $T_1$, $T_2$, $T_3$, and $T_4$. The clock slave device 201 may perform the time synchronization with the clock master device 202 based on the computed time offset To and the computed delay time Td. The time offset To and the delay time Td may be computed using the following equations $$To = 0.5 * \{(T_2 - T_1) + (T_3 - T_4)\} \text{ and}$$

$$Td = 0.5 * \{(T_4 - T_1) - (T_3 - T_2)\}, \text{ respectively.}$$

Based on the computed time offset To and the computed delay time Td, the APS apparatus 201 set to be the slave device may perform synchronization with a clock of the APS apparatus 202 set to be the master device by adding the time offset To and the delay time Td to a clock of the APS apparatus 201. According to an embodiment, an APS apparatus may transmit/receive a local time synchronization signal, and transmit/receive time synchronization signals to/from another APS apparatus on the same path, for example, redundant path or working path. The APS apparatus may simultaneously include a configuration of transmitting/receiving a local time synchronization signal, and a configuration of transmitting/receiving time synchronization signals to/from another APS apparatus on the same path. The APS apparatus may perform a different function based on whether the APS apparatus is set to be a master device or a slave device.

A time synchronization signal, a departure time of the time synchronization signal, and an arrival time of the time synchronization signal may be recorded in a reserved area of an APS frame and the APS frame may be transmitted/received. The APS apparatus may extract the time synchronization signal, the departure time of the time synchronization signal, and the arrival time of the time synchronization signal recorded in the APS frame, and perform computation for time synchronization and clock setting. Further, the time synchronization signal, the departure time of the time synchronization signal, and the arrival time of the time synchronization signal may be recorded in a reserved area of an ODU frame and the ODU frame may be transmitted/received. The APS apparatus may receive the time synchronization signal, the departure time of the time synchronization signal, and the arrival time of the time synchronization signal extracted and transmitted from an OTN framer. In addition, the APS apparatus may receive the extracted APS frame from the OTN framer, and may extract the time synchronization signal, the departure time of the time synchronization signal, and the arrival time of the time synchronization signal recorded in the reserved area of the received APS frame.

According to embodiments, time information exchanged between APS apparatuses positioned on a working path and a redundant path may be transmitted through an interface, for example, a serial gigabit media-independent interface (SGMII), or transmitted while being included in a payload portion of an Ethernet frame.

Figure 4A:
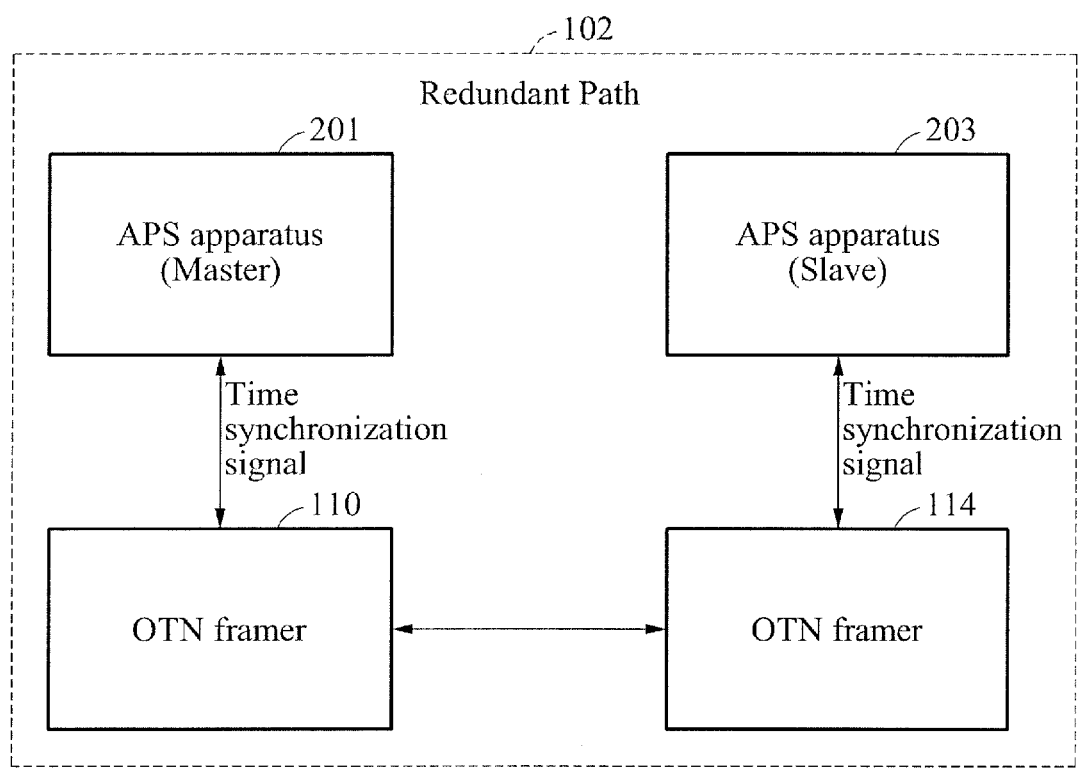
FIGS. 4A and 4B are diagrams illustrating a process of performing time synchronization according to an embodiment.
Figure 4B:
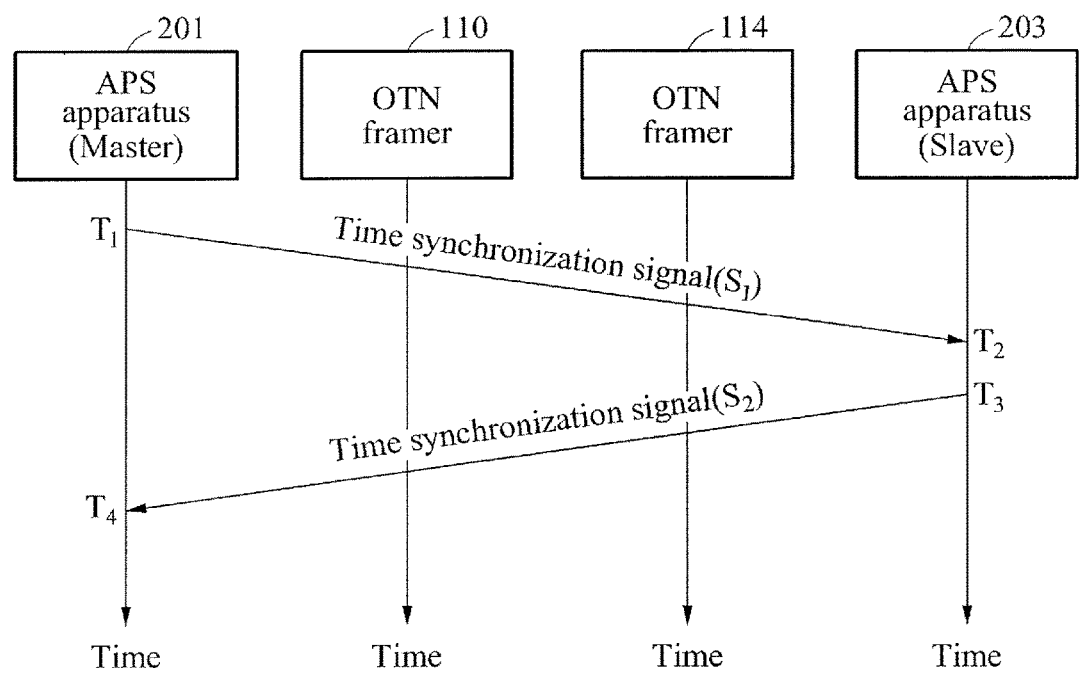

FIGS. 4A and 4B are diagrams illustrating a process of performing time synchronization according to an embodiment.

Referring to FIG. 4A, time synchronization between the remote APS apparatuses 201 and 203 belonging to the redundant path 102 may be performed through transmission/reception of time synchronization signals via the OTN framers 110 and 114. The foregoing is similar to the time synchronization process described with reference to FIGS. 3A and 3B, and differs from the same in that the time synchronization signals are transmitted/received through the OTN framers. Embodiments are not limited to time synchronization between remote APS apparatuses belonging to a redundant path as shown in FIG. 4A, and include time synchronization by transmission/reception of time synchronization signals via OTN framers.

Referring to FIG. 4B, the APS apparatus 201 belonging to the redundant path may be set to be a clock master device, and the remote APS apparatus 203 belonging to the redundant path may be set to be a clock slave device. In another example, the APS apparatuses 201 and 203 may be set reversely.

Similar to FIG. 3B, time synchronization signals $S_1$ and $S_2$ may be transmitted/received between the clock master device 201 and the clock slave device 203. Departure and arrival times $T_1$, $T_2$, $T_3$, and $T_4$ of the time synchronization signals $S_1$ and $S_2$ may be measured, transmitted/received, and stored by the clock master device 201 or the clock slave device 203. The descriptions provided with reference to FIG. 3B may be applicable here, and thus duplicated descriptions will be omitted for conciseness.

The time synchronization signals $S_1$ and $S_2$, and the departure and arrival times $T_1$, $T_2$, $T_3$, and $T_4$ may be recorded in a reserved area of an APS frame. The APS frame may be recorded in an overhead of an ODU frame and the ODU frame may be transmitted/received by the OTN framers 110 and 114. The APS frame recorded in the overhead of the ODU frame may be extracted by the OTN framers 110 and 114 and transmitted to the APS apparatuses 201 and 203. The APS apparatuses 201 and 203 receiving the APS frame may extract the time synchronization signals $S_1$ and $S_2$, and the departure and arrival times $T_1$, $T_2$, $T_3$, and $T_4$ recorded in the reserved area of the APS frame. As described with reference to FIGS. 3A and 3B, the APS apparatuses 201 and 203 may compute a time offset and a delay time based on the departure and arrival times $T_1$, $T_2$, $T_3$, and $T_4$ and may perform time synchronization. Further, the time synchronization signals $S_1$ and $S_2$, and the departure and arrival times $T_1$, $T_2$, $T_3$, and $T_4$ recorded in the reserved area of the APS frame may be extracted by the OTN framers 110 and 114, and transmitted to the APS apparatuses 201 and 203.

In another example, the time synchronization signals $S_1$ and $S_2$, and the departure and arrival times $T_1$, $T_2$, $T_3$, and $T_4$ may be recorded in the reserved area of the overhead of the ODU frame and the ODU frame may be transmitted/received via the OTN framers 110 and 114. The APS apparatuses 201 and 203 may transmit the time synchronization signals or the departure and arrival times to the OTN framers 110 and 114. The time synchronization signals $S_1$ and $S_2$, and the departure and arrival times $T_1$, $T_2$, $T_3$, and $T_4$ may be recorded in the reserved area of the overhead of the ODU frame by the OTN framers 110 and 114. In response to reception of the ODU frame, the OTN framers 110 and 114 may extract the time synchronization signals $S_1$ and $S_2$, and the departure and arrival times $T_1$, $T_2$, $T_3$, and $T_4$ recorded in the reserved area of the overhead of the ODU frame, and transmit the time synchronization signals $S_1$ and $S_2$, and the departure and arrival times $T_1$, $T_2$, $T_3$, and $T_4$ to the APS apparatuses 201 and 203.

FIG. 5 is a diagram illustrating an APS frame according to an embodiment.

The APS apparatus 201 may transmit a time synchronization signal or a switching over time to the APS apparatus 203 of the third transmission medium 106 using an APS frame. Referring to FIG. 5, the APS frame may include request/state information, a protection type, request signal information, and bridge signal information. The time synchronization signal may be recorded in a reserved area of the APS frame. The switching over time may be recorded in the reserved area of the APS frame. The OTN framers 110 and 114 of the first transmission medium 104 and the third transmission medium 106 corresponding to local and remote line cards of the redundant path 102 may transmit/receive the APS frame. The APS frame may be recorded in an overhead of an ODU frame of ITU-T Recommendation G873.1. The OTN framer 110 may record, in the overhead of the ODU frame, the APS frame in which the time synchronization signal or the switching over time is recorded, and transmit the ODU frame to the OTN framer 114. Through transmission/reception of the APS frame, time synchronization between the first transmission medium 104 and the third transmission medium 106 may be performed, and the APS apparatus 203 of the third transmission medium 106 may receive the switching over time.

The reserved area of the APS frame may be configured by 8 bits. By supplementing an insufficient recording area using the overhead of the ODU frame, precise time synchronization may be performed.

FIG. 6 is a diagram illustrating an overhead of an ODU frame according to an embodiment.

A switching over time generated by the APS apparatus 201 may be recorded in a reserved area of an overhead of an ODU frame. A time synchronization signal of the first transmission medium 104 may be recorded in the reserved area of the overhead of the ODU frame. Referring to FIG. 6, when a reserved area of an ODU frame is used in addition to a reserved area of an APS frame to record a time synchronization signal or a switching over time, an area of more than 32 bits may be secured, and thus more precise time synchronization may be performed. A frame structure for time synchronization may be, for example, a structure such as precision time protocol (PTP) or the IEEE 1588 standard. In this example, the frame may have a 48-bit time synchronization signal to achieve a precision of less than nanoseconds (ns).

The ODU frame may be transmitted/received while the time synchronization signal is recorded in the reserved area of the overhead of the ODU frame, and the APS frame may be transmitted/received while the switching over time is recorded in the reserved area of the APS frame. Embodiments may include an example in which a time synchronization signal is recorded in an APS frame and the APS frame is transmitted, and also include an example in which the time synchronization signal is transmitted/received separately from the APS frame.

Figure 7:
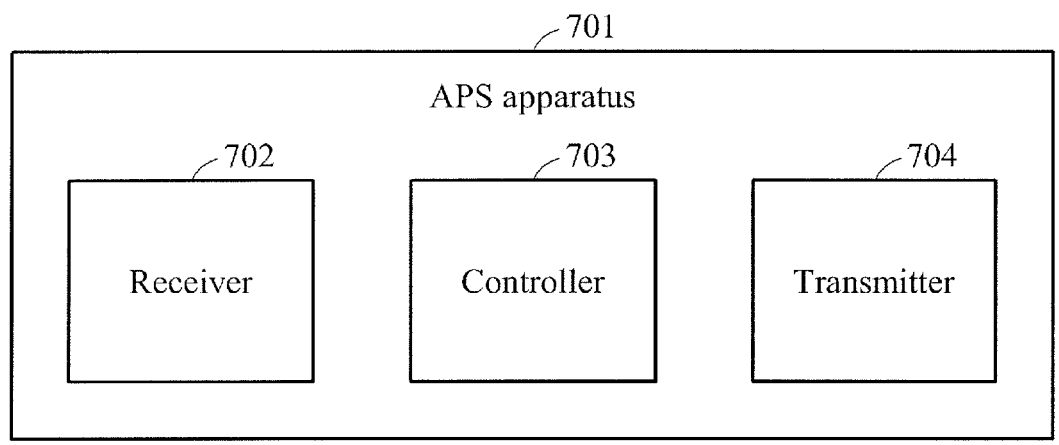
FIG. 7 is a block diagram illustrating a configuration of an APS apparatus according to an embodiment.

FIG. 7 is a block diagram illustrating a configuration of an APS apparatus according to an embodiment.

An APS apparatus of a working path and an APS apparatus of a redundant path may have the same configurations. Conversely, the APS apparatuses may have different functions based on whether the APS apparatuses belong to the working path or the redundant path.

Referring to FIG. 7, an APS apparatus 701 may include a receiver 702, a controller 702, and a transmitter 704.

In a case of the APS apparatus 701 belonging to a redundant path, the receiver 702 may receive signal defect information of a transmission medium belonging to the redundant path and signal defect information of a transmission medium belonging to a working path. The receiver 702 may receive the signal defect information of the transmission medium of the redundant path from an OTN framer of the redundant path. In response to signal failure occurring in an OTN framer of the working path, the receiver 702 may receive the signal defect information of the transmission medium of the working path transmitted from an APS apparatus of the transmission medium belonging to the working path. An operator may input command information, for example, a forced switching command or a manual switching command, into a main processor, and the receiver 702 may receive the input command information of the operator through the main processor.

The receiver 702 may receive a time synchronization signal from the APS apparatus of the transmission medium corresponding to a local line card belonging to the working path.

The receiver 702 may receive a switching command generated by an APS apparatus of a transmission medium corresponding to a remote line card belonging to the redundant path, switching information, and a switching over time. The receiver 702 may receive a time synchronization signal of the transmission medium corresponding to the remote line card belonging to the redundant path. The switching over time or the time synchronization signal may be recorded in a reserved area of an APS frame or in a reserved area of an overhead of an ODU frame.

In a case of the APS apparatus 701 belonging to a working path, the receiver 702 may receive a switching command to change traffic paths of a transmission medium belonging to a redundant path and a transmission medium belonging to the working path, switching information, and a switching over time. The operator may input command information, for example, a forced switching command or a manual switching command, into the main processor, and the receiver 702 may receive the input command information of the operator through the main processor.

The receiver 702 may receive a time synchronization signal from an APS apparatus of the transmission medium corresponding to a local line card belonging to the redundant path.

In the case of the APS apparatus 701 belonging to the redundant path, the controller 703 may generate a switching command to change the traffic paths of the transmission media of the working path and the redundant path based on the signal defect information of the transmission media of the working path and the redundant path and the command information. The controller 103 may generate switching information based on the switching command, and determine a switching over time to execute the switching command. The switching command may be determined based on a priority of the signal defect information and a priority of the command information. The controller 703 may generate the switching command by executing an APS protocol. The controller 703 may execute the APS protocol additionally using an APS frame received from a remote transmission medium belonging to the redundant path, thereby generating the switching command, the switching information, and the switching over time. The controller 703 may generate an APS frame in which the switching command, the switching information, and the switching over time are recorded. The controller 703 may record the switching over time or the time synchronization signal in the APS frame.

The controller 703 may perform time synchronization between the transmission media of the working path and the redundant path based on the time synchronization signal of the transmission medium of the working path and the time synchronization signal of the transmission medium of the redundant path which are received by the receiver 702. Further, the controller 703 may perform time synchronization between local and remote transmission media belonging to the redundant path based on a time synchronization signal of the transmission medium corresponding to the remote line card belonging to the redundant path.

In the case of the APS apparatus 701 belonging to the working path, the controller 703 may open/close a traffic path of an OTN framer of the transmission medium belonging to the working path based on the switching command, the switching information, and the switching over time received by the receiver 702.

The controller 703 may perform time synchronization between the transmission media of the working path and the redundant path based on the time synchronization signal of the transmission medium of the redundant path and the time synchronization signal of the transmission medium of the working path which are received by the receiver 702.

In the case of the APS apparatus 701 belonging to the redundant path, the transmitter 704 may transmit the switching information and the switching over time to the OTN framer of the transmission medium of the redundant path.

The transmitter 704 may transmit the switching command, the switching information corresponding to the switching command, and the switching over time to the APS apparatus of the transmission medium corresponding to the local line card belonging to the working path. The transmitter 704 may transmit the time synchronization signal of the transmission medium of the redundant path to the APS apparatus of the transmission medium corresponding to the local line card.

The transmitter 704 may transmit the switching command, the switching information, and the switching over time to the APS apparatus of the transmission medium corresponding to the remote line card belonging to the redundant path. The transmitter 704 may transmit the time synchronization signal to the transmission medium corresponding to the remote line card belonging to the redundant path. The switching over time or the time synchronization signal may be recorded in the reserved area of the APS frame or in the reserved area of the overhead of the ODU frame.

In the case of the APS apparatus 701 belonging to the working path, the transmitter 704 may transmit the switching information and the switching over time to the OTN framer of the transmission medium of the working path.

The transmitter 704 may transmit the signal defect information of the transmission medium of the working path to the transmission medium corresponding to the local line card belonging to the redundant path.

The transmitter 704 may transmit the time synchronization signal to the APS apparatus of the transmission medium corresponding to the local line card belonging to the redundant path.

Figure 8:
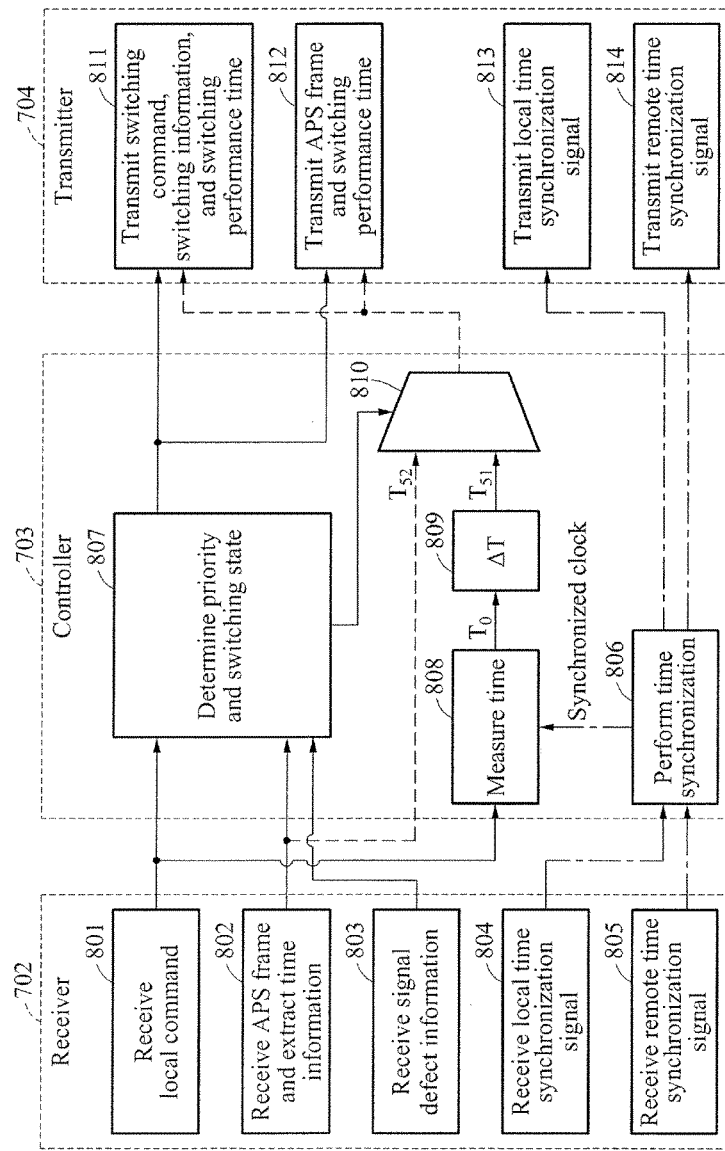
FIG. 8 is a diagram illustrating a configuration of an APS apparatus according to an embodiment.

FIG. 8 is a diagram illustrating a configuration of an APS apparatus according to an embodiment.

Referring to FIG. 8, the receiver 702 may receive a local command in operation 801. The receiver 702 may receive an APS frame transmitted from an external APS apparatus, and extract time information recorded in the APS frame in operation 802. A switching command, switching information, and a switching over time may be recorded in the APS frame. The time information recorded in the APS frame may be a time at which an OTN framer is to perform switching. The time information may be recorded in a reserved area of the APS frame.

The receiver 702 may receive signal defect information in operation 803. The signal defect information may include signal defect information of a working path and signal defect information of a redundant path. The received signal defect information may be used to determine a switching state.

The receiver 702 may receive a local time synchronization signal in operation 804, and receive a remote time synchronization signal in operation 805. The local time synchronization signal and the remote time synchronization signal may be the same as the time synchronization signal $S_1$ and the time synchronization signal $S_2$ used to perform time synchronization as described with reference to FIGS. 3A through 4B. In detail, the local time synchronization signal may be the time synchronization signal described with reference to FIGS. 3A and 3B. The receiver 702 may also receive information related to departure and arrival times of the time synchronization signal. The remove time synchronization signal may be the time synchronization signal described with reference to FIGS. 4A and 4B. Information related to the departure and arrival times may also be received by the receiver 702. As described above in detail, the controller 703 may compute departure and arrival times of the time synchronization signals, and perform time synchronization in operation 806. The information related to the time synchronization signals, the departure times, and the arrival times may be recorded in the reserved area of the APS frame or in the reserved area of the overhead of the ODU frame.

The controller 703 may determine a priority and a switching state based on the received local command, the switching command recorded in the APS frame, the switching information, and the signal defect information of the working path and the redundant path in operation 807. The controller 703 may generate a switching command based on the determined switching state and generate switching information to execute the generated switching command, which may be performed by an APS protocol. The controller 703 may determine a command or a state having a highest priority based on the received local command, the APS frame, the signal defect information, and priorities defined in G.873.1, and determine whether switching is to be performed based on the determined command or state. Further, the controller 703 may transmit corresponding time information to the transmitter 704 based on the determined command or state.

The transmitter 704 may transmit the time synchronization signals for time synchronization. The transmitter 704 may transmit the local time synchronization signal in operation 813, and transmit the remote time synchronization signal in operation 814. The transmitter 704 may transmit the time synchronization signals received by the receiver 702 in operations 804 and 805, the departure times, and the arrival times. The transmitter 704 may transmit the determined switching command, the switching information, and the switching over time in operation 811. The transmitted switching command, the switching information, and the switching over time may be transmitted to an OTN framer to be transmitted to another APS apparatus. Further, the transmitter 704 may transmit the APS frame and the switching over time in operation 812. The switching over time and the APS frame may be generated by the controller 703, and the switching over time may be recorded in the reserved area of the APS frame.

For example, in response to the local command received by the receiver 702 in operation 801 and the local forced switching command determined as a command with a highest priority by the controller 703 in operation 807, the controller 703 may measure a time To at which the local command is determined in operation 808. The controller 703 may generate new switching over time information $T_{S1}$ by adding a predefined time $\Delta T$ to the measured To in operation 809. The predefined time $\Delta T$ may be obtained experimentally, or set to be a value sufficient to match with a switching time, for example, 50 milliseconds (ms), by measurement. In response to the forced switching command determined by the controller 703, the switching information may be transmitted to the transmitter 704 along with the generated switching over time information $T_{S1}$ in operation 810. The switching command and the switching over time information $T_{S1}$ may be transmitted by the transmitter 704. The switching over time information $T_{S1}$ may be recorded in the reserved area of the APS frame and the APS frame may be transmitted to the external APS apparatus, or the switching over time information $T_{S1}$ may be recorded in the reserved area of the overhead of the ODU frame and the ODU frame may be transmitted by the OTN framer.

As another example, in response to the switching command recorded in the APS frame received from the remote transmission medium in operation 802 and a remote forced switching command determined as a command with a highest priority by the controller 703 in operation 807, the controller 703 may extract a switching over time $T_{S2}$ recorded in the APS frame. The extracted switching over time $T_{S2}$ may be transmitted to the transmitter 704 along with the remote forced switching command in operation 810, and transmitted to the external APS apparatus by the transmitter 704. The switching over time $T_{S2}$ may be recorded in the reserved area of the APS frame and the APS frame may be transmitted to the external APS frame, or the switching over time $T_{S2}$ may be recorded in the reserved area of the overhead of the ODU frame and the ODU frame may be transmitted by the OTN framer.

Figure 9:
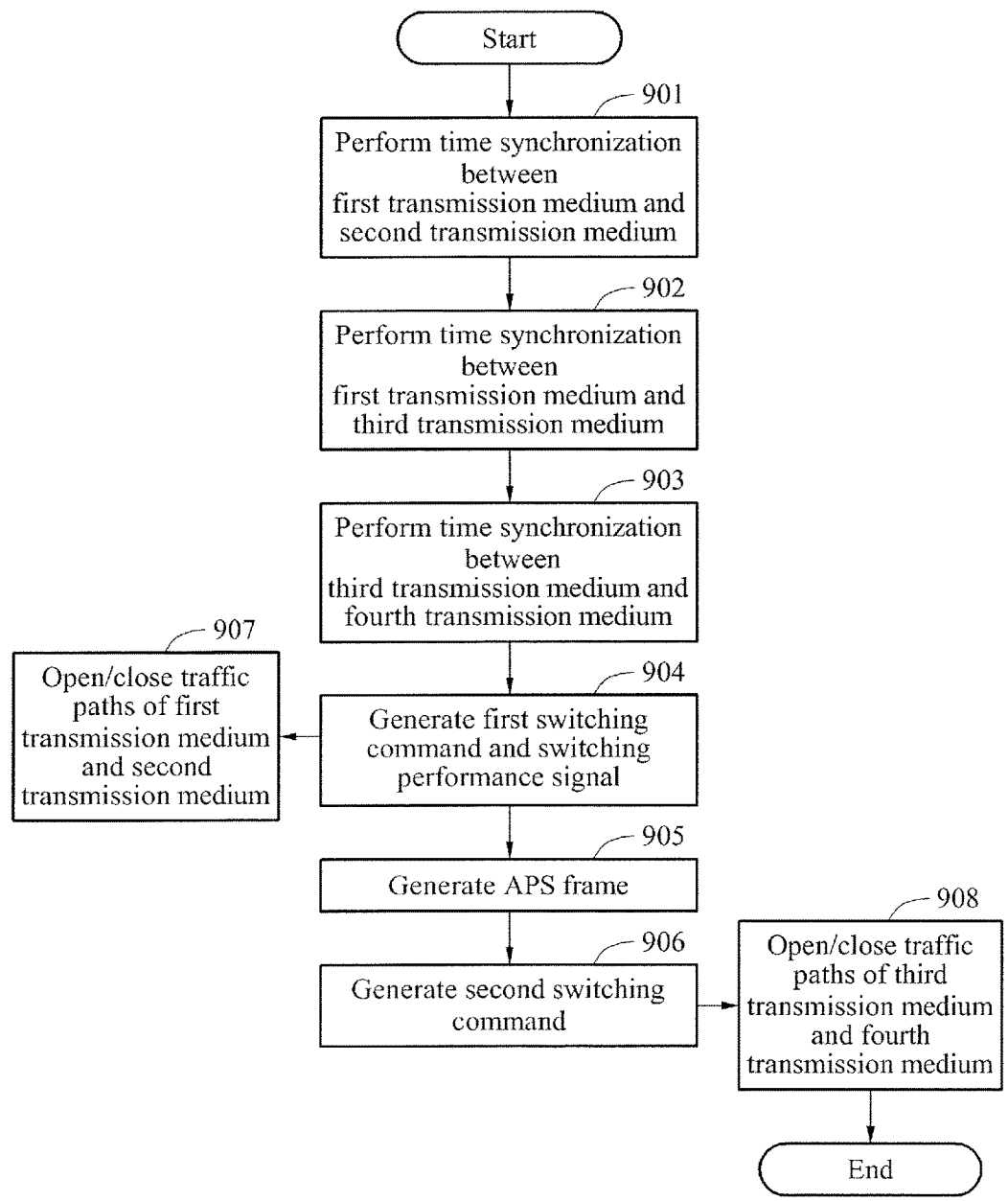
FIG. 9 is a flowchart illustrating an APS method according to an embodiment.

FIG. 9 is a flowchart illustrating an APS method according to an embodiment.

Referring to FIG. 9, in operation 901, the APS method may perform time synchronization between a first transmission medium corresponding to a local line card belonging to a redundant path and a second transmission medium corresponding to a local line card belonging to a working path. APS apparatuses of the first transmission medium and the second transmission medium may transmit/receive time synchronization signals of the first transmission medium and the second transmission medium to/from each other. The APS apparatuses of the first transmission medium and the second transmission medium may perform time synchronization based on the transmitted/received time synchronization signals of the first transmission medium and the second transmission medium. Detailed descriptions are as provided above. By periodically transmitting/receiving the time synchronization signals between the local line cards, the time synchronization may be maintained.

In operation 902, the APS method may perform time synchronization between the first transmission medium corresponding to the local line card belonging to the redundant path and a third transmission medium corresponding to a remote line card belonging to the redundant path. APS apparatuses of the first transmission medium and the third transmission medium may transmit/receive time synchronization signals of the first transmission medium and the third transmission medium to/from each other. The APS apparatuses of the first transmission medium and the third transmission medium may record the time synchronization signals in a reserved area of an APS frame or in a reserved area of an overhead of an ODU frame, and transmit/receive the APS frame or the ODU frame. The APS apparatuses of the first transmission medium and the third transmission medium may perform time synchronization based on the transmitted/received time synchronization signals of the first transmission medium and the third transmission medium. Detailed descriptions are as provided above. By periodically transmitting/receiving the time synchronization signals between the local line card and the remote line card, the time synchronization may be maintained.

In operation 903, the APS method may perform time synchronization between the third transmission medium corresponding to the remote line card belonging to the redundant path and a fourth transmission medium corresponding to a remote line card belonging to the working path. APS apparatuses of the third transmission medium and the fourth transmission medium may transmit/receive time synchronization signals of the third transmission medium and the fourth transmission medium to/from each other. The APS apparatuses of the third transmission medium and the fourth transmission medium may perform time synchronization based on the transmitted/received time synchronization signals of the third transmission medium and the fourth transmission medium. Detailed descriptions are as provided above. By periodically transmitting/receiving the time synchronization signals between the remote line cards, the time synchronization may be maintained. Thus, through operation 901 of performing time synchronization between the first transmission medium and the second transmission medium by transmitting/receiving the time synchronization signals, operation 902 of performing time synchronization between the first transmission medium and the third transmission medium by transmitting/receiving the time synchronization signals recorded in the reserved area of the APS frame or in the reserved area of the overhead of the ODU frame, and operation 903 of performing time synchronization between the third transmission medium and the fourth transmission medium by transmitting/receiving the time synchronization signals, time synchronization among the first transmission medium and the second transmission medium corresponding to the local line cards and the third transmission medium and the fourth transmission medium corresponding to the remote line cards may be maintained.

In operation 904, the APS apparatus of the first transmission medium corresponding to the local line card belonging to the redundant path may generate a first switching command based on signal defect information of the second transmission medium corresponding to the local line card belonging to the working path, signal defect information of the first transmission medium, and a command of an operator. The first switching command may be a command to change traffic paths of the first transmission medium and the second transmission medium. The APS apparatus may control opening/closing of the traffic paths based on the first switching command. Further, the APS apparatus may generate the first switching command further based on an APS frame received from an external transmission medium. The APS apparatus may generate switching information to execute the first switching command and a switching over time corresponding to a time at which the switching command is to be executed. Detail descriptions of a configuration of generating the switching command are as provided above.

In operation 905, the APS apparatus of the first transmission medium corresponding to the local line card belonging to the redundant path may generate an APS frame. The APS frame may be generated by an APS protocol of ITU-T Recommendation G.873.1. The APS frame generated by the APS protocol may include the first switching command, the switching information, and the switching over time. Detailed descriptions are as provided above.

In operation 906, the APS apparatus of the third transmission medium corresponding to the remote line card belonging to the redundant path may generate a second switching command based on signal defect information of the fourth transmission medium corresponding to the remote line card belonging to the working path, signal defect information of the third transmission medium, the command of the operator, and the APS frame received from the first transmission medium. The second switching command may be a command to change traffic paths of the third transmission medium and the fourth transmission medium. The APS apparatus may control opening/closing of the traffic paths based on the second switching command. The APS apparatus may generate switching information to execute the second switching command. Detailed descriptions of a configuration of generating the switching command are as provided above.

In operation 907, the APS method may open/close the traffic paths of the first transmission medium and the second transmission medium based on the first switching command at the switching over time generated in operation 904. OTN framers of the first transmission medium and the second transmission medium may turn ON or OFF switches on the traffic paths based on the switching information at the switching over time received from the APS apparatuses. Detailed descriptions of a configuration of opening/closing the traffic paths are as provided above.

In operation 908, the APS method may open/close the traffic paths of the third transmission medium and the fourth transmission medium based on the second switching command generated in operation 906 at the switching over time generated in operation 904. OTN framers of the third transmission medium and the fourth transmission medium may turn ON or OFF switches on the traffic paths based on the switching information at the switching over time received from the APS apparatuses. Detailed descriptions of a configuration of opening/closing the traffic paths are as provided above. Thus, the first transmission medium and the second transmission medium corresponding to the local line cards and the third transmission medium and the fourth transmission medium corresponding to the remote line cards may open/close the traffic paths at the received switching over time in a state in which time synchronization is maintained. Thus, traffic loss resulting from different switching times may be minimized.

According to an embodiment, a data loss occurring due to different protection switching times of transmission media may be minimized through transmission/reception of a time synchronization signal and a switching over time.

According to an embodiment, time synchronization may be effectively performed using an APS frame and an ODU frame.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A linear automatic protection switching (APS) apparatus in an optical transport network (OTN) system, the apparatus comprising:
   a receiver configured to receive signal defect information of a first transmission medium belonging to a redundant path and a second transmission medium belonging to a working path, and command information of an operator;
   a controller configured to generate a switching command to change traffic paths of the first transmission medium and the second transmission medium and switching information corresponding to the switching command based on the signal defect information and the command information, and determine a switching over time to execute the switching command; and
a transmitter configured to transmit the switching command and the switching over time, and
wherein the transmitter is configured to transmit a first time synchronization signal of the first transmission medium to the second transmission medium,
the receiver is configured to receive a second time synchronization signal of the second transmission medium, and
the controller is configured to perform time synchronization between the first transmission medium and the second transmission medium based on the first time synchronization signal and the second time synchronization signal.

2. The apparatus of claim 1, wherein the transmitter is configured to transmit the switching information and the switching over time to an OTN framer of the first transmission medium, and
the OTN framer of the first transmission medium is configured to open/close the traffic path of the first transmission medium at the switching over time.

3. The apparatus of claim 1, wherein the switching command is determined based on a priority of the signal defect information and a priority of the command information.

4. The apparatus of claim 1, wherein the switching command is generated by an APS protocol.

5. The apparatus of claim 1, wherein the transmitter is configured to transmit the switching command, the switching information corresponding to the switching command, and the switching over time to the second transmission medium.

6. The apparatus of claim 5, wherein the switching over time is recorded in a reserved area of an APS frame and the APS frame is transmitted.

7. The apparatus of claim 1, wherein the controller is configured to compute a time offset To and a delay time Td based on a time $T_1$ at which the second time synchronization signal departs from the second transmission medium, a time $T_2$ at which the second time synchronization signal arrives at the first transmission medium, a time $T_3$ at which the first time synchronization signal departs from the first transmission medium, and a time $T_4$ at which the first time synchronization signal arrives at the second transmission medium, and perform the time synchronization by adding the computed time offset To and the computed delay time Td to time information of the first transmission medium,
wherein the time offset To and the delay time Td are computed using equations $$To=0.5*\{(T_2-T_1)+(T_3-T_4)\}$$ and $$Td=0.5*\{(T_4-T_1)-(T_3-T_2)\}, \text{respectively.}$$

8. The apparatus of claim 7, wherein the first time synchronization signal, the second time synchronization signal, the time $T_1$, the time $T_2$, the time $T_3$, and the time $T_4$ are recorded in a reserved area of an APS frame and the APS frame is transmitted/received.

9. The apparatus of claim 1, wherein the controller is configured to generate an APS frame comprising the switching command and the switching information by executing an APS protocol, and
the APS frame and the switching over time are transmitted to a third transmission medium belonging to the redundant path.

10. The apparatus of claim 9, wherein the transmitter is configured to transmit the APS frame to an OTN framer of the first transmission medium, and
the APS frame is recorded in an overhead of an optical data unit (ODU) frame by the OTN framer of the first transmission medium and the ODU frame is transmitted to an OTN framer of the third transmission medium.

11. The apparatus of claim 10, wherein the switching over time is recorded in a reserved area of the APS frame, and
the APS frame is extracted by the OTN framer of the third transmission medium and transmitted to an APS apparatus of the third transmission medium.

12. The apparatus of claim 10, wherein the switching over time is recorded in a reserved area of the overhead of the ODU frame, and
the switching over time recorded in the reserved area of the overhead of the ODU frame is extracted by the OTN framer of the third transmission medium and transmitted to an APS apparatus of the third transmission medium.

13. The apparatus of claim 1, wherein the transmitter is configured to transmit the first time synchronization signal of the first transmission medium to the third transmission medium,
the receiver is configured to receive a third time synchronization signal of the third transmission medium,
the controller is configured to perform time synchronization between the first transmission medium and the third transmission medium based on departure and arrival times of the first time synchronization and departure and arrival times of the third time synchronization signal, and
the first time synchronization signal, the departure and arrival times of the first time synchronization signal, the third time synchronization signal, and the departure and arrival times of the third time synchronization signal are recorded in a reserved area of the APS frame or in a reserved area of an overhead of an ODU frame and the APS frame or the ODU frame is transmitted/received.

14. The apparatus of claim 9, wherein an APS apparatus of the third transmission medium is configured to:
receive the APS frame and the switching over time and generate a second switching command to change traffic paths of the third transmission medium and a fourth transmission medium and second switching information corresponding to the second switching command based on the APS frame, the fourth transmission medium belonging to the working path,
open/close the traffic path of the third transmission medium by transmitting the second switching information and the switching over time to an OTN framer of the third transmission medium, and
transmit the second switching command, the second switching information, and the switching over time to the fourth transmission medium.

15. The apparatus of claim 14, wherein the third transmission medium is configured to transmit/receive a time synchronization signal to/from the fourth transmission medium, and perform time synchronization between the third transmission medium and the fourth transmission medium, and
the time synchronization signal is recorded in a reserved area of an APS frame and the APS frame is transmitted/received.

16. A linear automatic protection switching (APS) apparatus in an optical transport network (OTN) system, the apparatus comprising:
 a receiver configured to receive, from a first transmission medium belonging to a redundant path, a switching command to change traffic paths of the first transmission medium and a second transmission medium belonging to a working path, switching information corresponding to the switching command, and a switching over time to execute the switching command;
 a controller configured to execute the switching command at the switching over time; and
 a transmitter configured to transmit signal defect information of the second transmission medium to the first transmission medium, and
 wherein the receiver is configured to receive a first time synchronization signal of the first transmission medium,
 the controller is configured to perform time synchronization between the first transmission medium and the second transmission medium based on the first time synchronization signal and a second time synchronization signal of the second transmission medium, and
 an OTN framer of the second transmission medium is configured to open/close the traffic path of the second transmission medium at the switching over time.

17. The apparatus of claim 16, wherein the transmitter is configured to transmit the switching information and the switching over time to the OTN framer of the second transmission medium, record the second time synchronization signal of the second transmission medium in a reserved area of an APS frame, and transmit the APS frame to the first transmission medium.

18. A linear automatic protection switching (APS) method comprising:
 performing time synchronization between a first transmission medium belonging to a redundant path and a second transmission medium belonging to a working path based on a time synchronization signal of the first transmission medium and a time synchronization signal of the second transmission medium;
 performing time synchronization between the first transmission medium and a third transmission medium belonging to the redundant path by transmitting the time synchronization signal of the first transmission medium to the third transmission medium;
 performing time synchronization between the third transmission medium and a fourth transmission medium belonging to the working path based on a time synchronization signal of the third transmission medium and a time synchronization signal of the fourth transmission medium;
 generating a first switching command to change traffic paths of the first transmission medium and the second transmission medium and a switching over time to execute the first switching command based on signal defect information of the first transmission medium and the second transmission medium and command information of an operator;
 generating an APS frame comprising the first switching command and the switching over time by executing an APS protocol;
 generating a second switching command to change traffic paths of the third transmission medium and the fourth transmission medium based on the APS frame;
 opening/closing the traffic paths of the first transmission medium and the second transmission medium at the switching over time based on the first switching command; and
 opening/closing the traffic paths of the third transmission medium and the fourth transmission medium at the switching over time based on the second switching command.

19. The method of claim 18, wherein the switching over time or the time synchronization signal, of the first transmission medium, transmitted to the third transmission medium is recorded in a reserved area of the APS frame or in a reserved area of an overhead of an optical data unit (ODU) frame in which the APS frame is recorded.

* * * * *